United States Patent
Leam et al.

[19]

[11] Patent Number: 6,030,085
[45] Date of Patent: Feb. 29, 2000

[54] ADJUSTABLE MIRROR SUPPORT ASSEMBLY

[76] Inventors: Heather West Leam; Robert J. Leam, both of 201 Mokelumne River Dr., Lodi, Calif. 95240

[21] Appl. No.: 09/253,267

[22] Filed: Feb. 19, 1999

[51] Int. Cl.⁷ ..................................................... G02B 8/182
[52] U.S. Cl. .......................... 359/871; 359/872; 359/875; 359/879; 359/880
[58] Field of Search .................................. 359/871, 872, 359/875, 879, 880; 248/497, 490

[56] References Cited

U.S. PATENT DOCUMENTS

| | | | |
|---|---|---|---|
| 5,452,140 | 9/1995 | Kody | 359/871 |
| 5,520,364 | 5/1996 | Bloxson et al. | 248/500 |
| 5,668,526 | 9/1997 | Collins | 340/326 |
| 5,684,758 | 11/1997 | Gray et al. | 368/10 |

*Primary Examiner*—Cassandra Spyrou
*Assistant Examiner*—Mohammad Y. Sikder
*Attorney, Agent, or Firm*—Bruce H. Johnsonbaugh

[57] ABSTRACT

An adjustable stuffed animal mirror support assembly is provided to facilitate viewing of a rear facing infant in the back seat of an automobile. The stuffed animal's body carries a convex mirror. A support strap is connected to the rear side of the body and extends upwardly to the back side of the head. An anchor strap connects to the back of the head and is also connected to a weighted bag. The mirror is adjusted by adjusting the weighted bag on the rear deck of the automobile and by manipulating the support strap relative to the anchor strap, each of which carries a strip of Velcro.

3 Claims, 4 Drawing Sheets

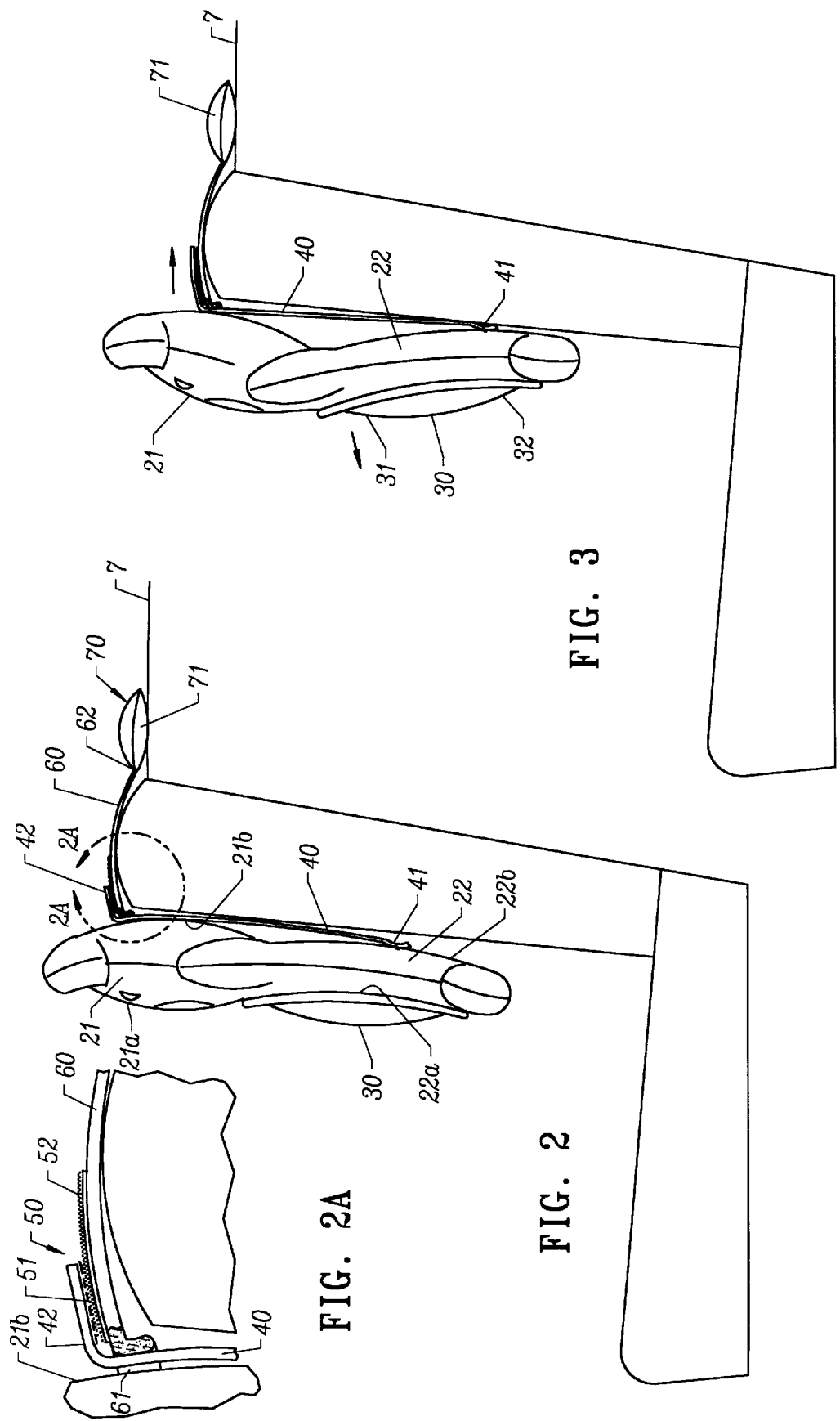

ADJUSTABLE MIRROR SUPPORT ASSEMBLY

BACKGROUND AND BRIEF SUMMARY OF THE INVENTION

The present invention relates generally to mirrors carried in the back seat of an automobile to view a rear facing infant. More particularly, the present invention provides a convex mirror carried on the body of a stuffed animal which may be utilized in viewing a rear facing infant in the back seat of an automobile and, alternately, may be supported on an article of household furniture.

The prior art includes various types of mirror assemblies for viewing a rear facing infant in the back seat of the automobile. For example, Harris U.S. Pat. No. 4,902,118 dated Feb. 20, 1990 teaches a planar mirror carried in a wedge-shaped support assembly and attached to the rear seat by straps and buckles that extend around the rear back seat. The Harris patent has several drawbacks, including the rather lengthy straps that must be utilized to support the mirror assembly to the rear seat. Such straps can be dangerous to infants should they become loose. A secondary drawback is that the planar mirror has a limited field of reflecting the image of the infant's face.

The Erickson U.S. Pat. No. 4,733,956 dated Mar. 29, 1988 shows another safety system for viewing infants in the rear seat utilizing a mirror assembly carried by the rear windshield. A disadvantage of the Erickson device is that the mirror occupies a considerable portion of the field of view through the rear windshield and increases the driver's "blind spot." Furthermore, the Erickson system includes a mirror which is rigidly attached to the back windshield and is not capable of being used on an article of furniture.

The Nolan-Brown U.S. Pat. No. 5,285,321 dated Feb. 8, 1994 teaches an observation mirror suspended from the top of the rear seat. The primary drawback of this device is that it utilizes a large metallic safety pin to attach the mirror to the seat. The large safety pin represents a serious threat to the infant should the mirror and/or safety pin become dislodged and should the infant be able to grasp the safety pin.

The Cossey U.S. Pat. No. 4,702,572 dated Oct. 27, 1987 teaches an adjustable mirror mounted above the rear seat incorporating a cumbersome and complex mounting mechanism that extends over the top of the back seat. This design includes the primary drawback of partially obstructing the driver's view through the back windshield and increases the driver's "blind spot." A second disadvantage is that this patent teaches a rather cumbersome and relatively heavy support mechanism for the mirror.

The present invention provides an extremely versatile and adjustable mirror support assembly for use in observing infants in automobile seats. In contrast to the prior art, the present invention can be readily removed from the automobile seat and suspended from an article of furniture. Furthermore, when the infant is old enough to face forwardly in a car seat, the present invention can be mounted to the back of the front seat and utilized to entertain the infant.

The present invention accomplishes the goal of providing visibility of a rear facing infant without increasing the "blind spot" of the driver looking through the rear view mirror of the automobile. The present invention also allows observation of the infant without including items of danger to the infant, such as large metallic safety pins or lengthy straps in which the infant may become entangled.

A primary object of the present invention is to provide an adjustable mirror support assembly for use in observing rear facing infants in an automobile without obstructing any of the driver's field of vision through the rear view mirror.

A further object of the invention is to provide an adjustable mirror support assembly for observing rear facing infants which does not include apparatus in the support assembly which presents a significant danger to the infant.

A further object of the invention is to provide an adjustable mirror support assembly in which the mirror is a lightweight plastic convex mirror carried on the body of a stuffed animal and which is pleasant and entertaining to the infant.

A further object of the invention is to provide a stuffed animal mirror which can be suspended from either the rear of front seat of an automobile or from an article of furniture.

Yet another object of the invention is to provide an infant observation mirror providing an extremely wide angle view of the infant's face.

Still another object of the invention is to provide an observation mirror for rear facing infants with a pivoting feature which inherently tends to keep the infant's face centered in the field of view as the mirror is adjusted upwardly and downwardly.

Other objects and advantages of the invention will become apparent from the following description and the drawings wherein:

BRIEF DESCRIPTION OF THE DRAWINGS

FIG. 2 is a side elevational view of the adjustable mirror support assembly of FIG. 1;

FIG. 2A is an enlarged sectional view of a portion of FIG. 2;

FIG. 3 is a side elevational view showing the inherent pivoting or rotational motion of the mirror as the stuffed animal support assembly is raised;

DETAILED DESCRIPTION OF THE DRAWINGS

Figure 1:
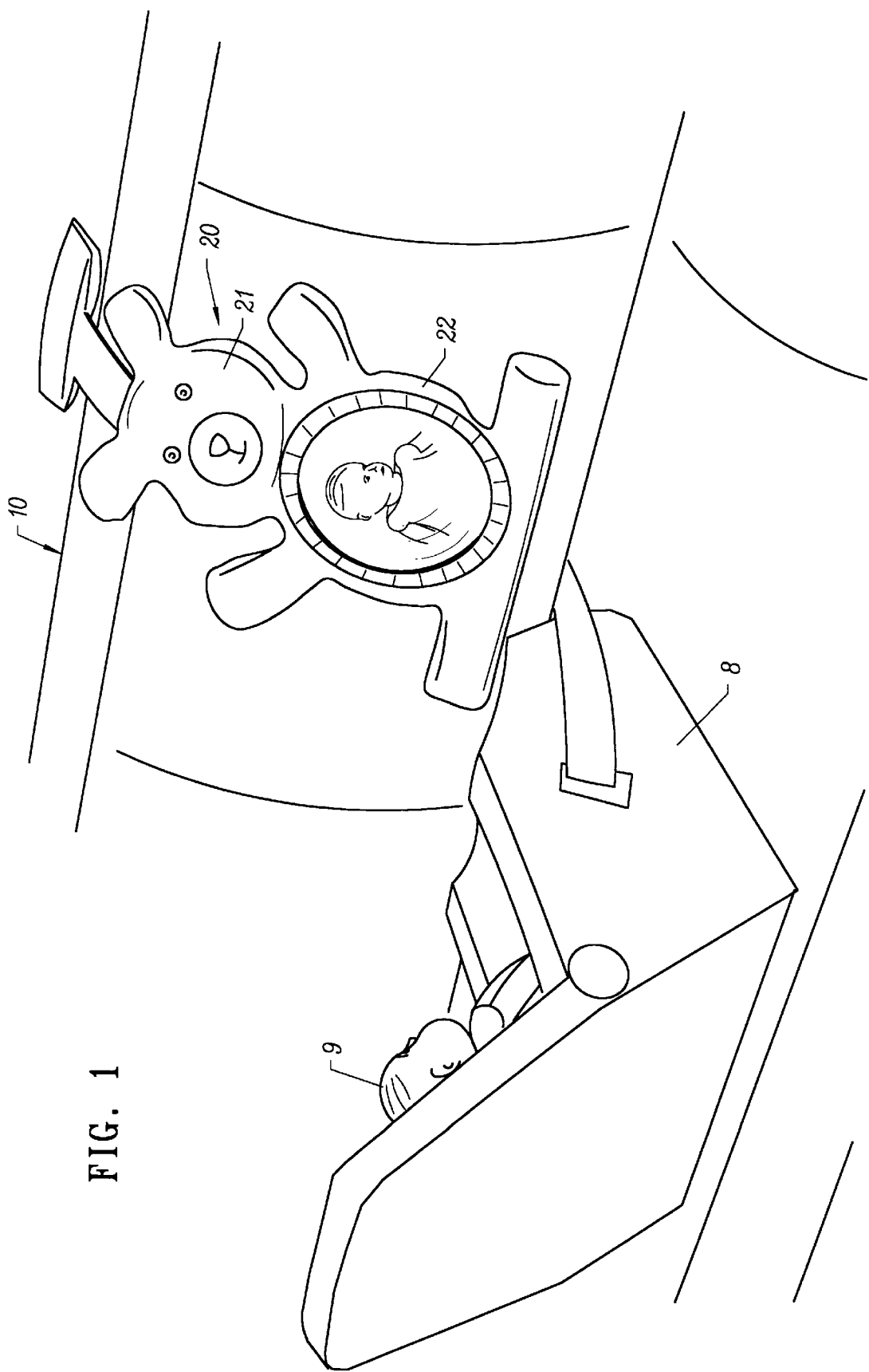
FIG. 1 is a schematic perspective representation of the stuffed animal mirror supported by the rear seat of an automobile.

FIGS. 1–3 show the preferred embodiment of the invention as supported on the rear seat 10 of an automobile to provide viewing of a rear facing infant 9 in car seat 8. The adjustable mirror support assembly shown generally as 20 includes a stuffed animal having a head 21 and a body 22, each having front sides 21a and 22a, respectively, and back sides 21b and 22b, respectively. The head 21 is pivotally connected to the body 22 so that the head and body articulate relative to each other as shown best in FIG. 3.

A convex mirror 30 is carried by the front side 22a of the stuffed animal's body 22. As the stuffed animal is adjusted upwardly as shown in FIG. 3, the mirror 30 inherently will rotate so that the top of the mirror 31 becomes closer to the infant's head and the bottom of the mirror 32 becomes further away from the head of the infant. This rotation of mirror 30, as the stuffed animal is adjusted upwardly, inherently tends to keep the face of the infant centered in the viewing range of the driver looking through the vehicle rear view mirror. Alternately, a passenger sitting in the front seat can turn around and also see the face of the infant easily because of the convex surface of mirror 30. The surface of mirror 30 is preferably lightweight plastic. The material of the stuffed animal's head and body are cloth and are stuffed with non-toxic and otherwise safe materials for use by infants.

A support strap 40 has a first end 41 which is connected as by sewing to the rear side 22b of the body 22 of the stuffed animal below the center of mirror 30. The first end 41 of support strap 40 may be attached to the rear side 22b at points as high as the center of mirror 30. If the attachment of first end 41 is made above the center of mirror 30, the mirror 30 does not articulate as well as when the attachment point is below the center of mirror 30. Support strap 40 extends upwardly and has an upper portion 42 which is connected to the back side 21b of the animal's head by adjustable support strap connection means shown generally as 50.

Adjustable support strap connection means 50 includes a first Velcro patch 51 carried by the upper end 42 of support strap means 40. The adjustable support strap connection means 50 also includes a second Velcro patch 52 carried by anchor strap means 60.

Anchor strap means 60 is a cloth strap having a first end 61 which is sewn to the back 21b of the animal's head. Strap 60 has a recess formed therein through which support strap 40 extends. The second end 62 of anchor strap means 60 is connected to an anchor means 70. Anchor means 70 is preferably a weighted cloth bag 71 stitched to anchor strap means 60, filled with either beans or sand and placed on the rear deck 7 of the automobile. To adjust mirror 30, the user lifts the upper end 42 of the support strap 40 and pulls upwardly to a desired position, and then presses upper end 42 downwardly against anchor strap 60. The first Velcro patch 51 is thereby pressed into contact at the desired position with second Velcro patch 52. The entire stuffed animal mirror assembly 20 is adjusted by moving the weighted bag 71 on rear deck 7. The entire assembly 20 is removed from the vehicle by simply lifting the weighted bag 71 off the rear deck and carrying the assembly 20 out of the vehicle.

Figure 4:
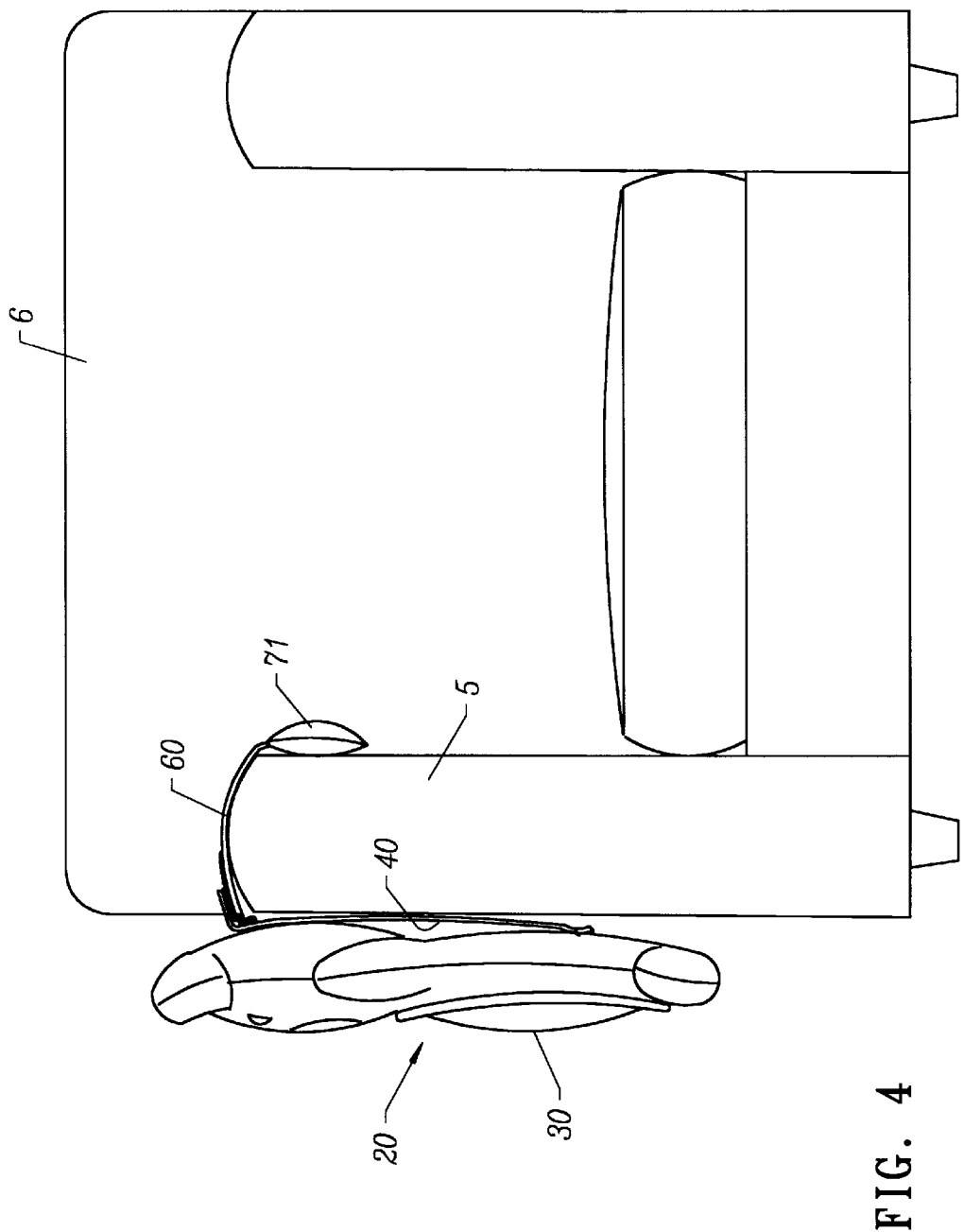
FIG. 4 is an elevational view showing the stuffed animal mirror assembly of FIGS. 1–3 as suspended from an article of furniture.

FIG. 4 shows how the stuffed animal mirror assembly 20 of the present invention can be easily supported on an arm 5 of a stuffed chair 6. Sandbag 71 and anchor strap means 60 are simply draped over the top of the arm 5 and support strap 40 is adjusted to orient the mirror 30. The stuffed animal mirror assembly 20 can therefore easily be used in a play area of the infant, and also may be applied to a side or end wall of an infant's crib. In these environments, the mirror assembly 20 provides entertainment for the infant and also facilitates observation of the infant.

Figure 5:
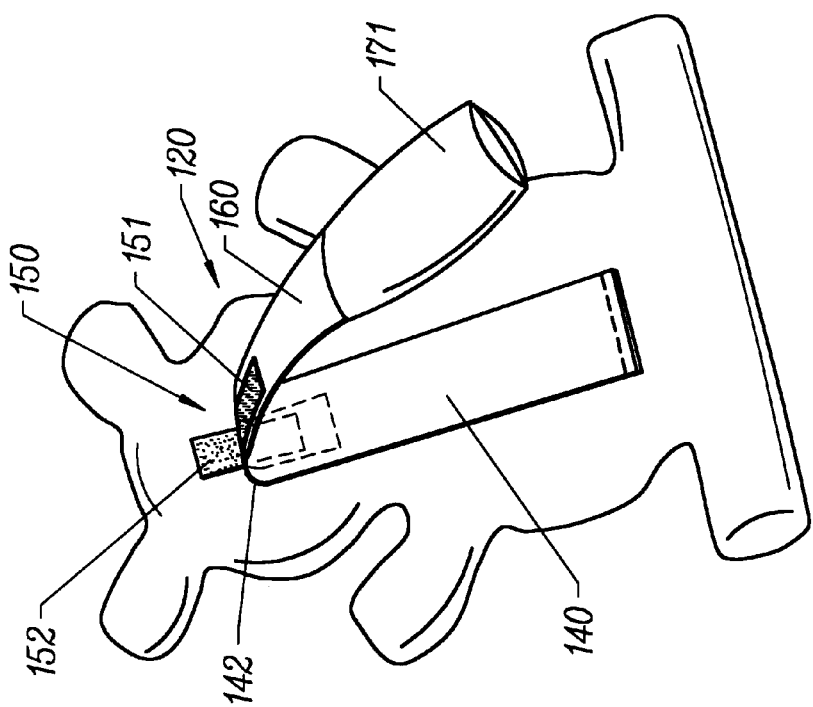
FIG. 5 is a perspective rear view of an alternate form of the invention using a single one-piece support strap.

FIG. 5 is a rear perspective view of an alternate embodiment 120 of the invention wherein the support strap 140 and anchor strap 160 are a single elongated strap. In this embodiment, the anchor strap 160 is not sewn or otherwise attached to the back of the stuffed animal's head. Rather, the adjustable strap connection means 150 in this embodiment includes a first Velcro patch 151 carried by the upper end 142 of strap 140. A second Velcro patch 152 is sewn or otherwise permanently attached to the back side of the head of the stuffed animal. The embodiment shown in FIG. 5 is a somewhat less preferred embodiment because the single strap which forms the support strap 140 and anchor strap 160 is longer in length than the double strap embodiment shown in FIGS. 1–4. The longer strap is a somewhat greater safety concern, although the strap shown in FIG. 5 is relatively wide and relatively short as compared with the attachment strap utilized in the prior art Harris patent.

It is understood that various modifications may be made without departing from the spirit of the invention. For example, it is readily apparent that stuffed animal designs other than bears can be utilized. Furthermore, materials other than plastic may be utilized for the mirror surface 30, as long as the material used is relatively lightweight and acceptable for use by infants. It is also possible to use other types of anchor means besides a weighted bag to attach the assembly to either the rear seat or front seat of an automobile or to an article of furniture, such as shown in FIG. 4. However, it is important to avoid potentially hazardous anchoring devices such as metallic safety pins. It is also possible to use other materials than a cloth stuffed animal. For example, a molded plastic animal could be utilized. Other materials could feasibly be used as long as the materials were lightweight and safe for use by infants.

What is claimed is:

1. An adjustable mirror support assembly enabling the assembly to be carried by a rear automobile seat and supported from a rear deck of said automobile, comprising:

a stuffed animal having a head and a body, each of said head and body having a front side and a back side, a convex mirror carried by the front side of said body of said stuffed animal, a support strap connected to the rear side of said body and extending upwardly to the back side of said head, adjustable support strap connection means for detachably and adjustably connecting said support strap to the back side of said head, wherein said body of said stuffed animal is moved relative to said head by adjusting said support strap, flexible anchor strap means connected to the back side of said head for supporting said stuffed animal and said convex mirror, and anchor means connected to said flexible anchor strap means for adjustably supporting said stuffed animal and said convex mirror from said rear deck, said anchor means including a weighted bag.

2. The apparatus of claim 1 wherein said head and body pivot relative to each other as said support strap is pulled upwardly.

3. The apparatus of claim 1 wherein said support strap and said anchor strap means comprise a single, elongated strap.

* * * * *